Z. E. RICE.
SPRING CLIP FOR AUTOMOBILE CHAIN FASTENERS.
APPLICATION FILED APR. 7, 1916.

1,220,002. Patented Mar. 20, 1917.

Inventor
Z. E. Rice
By Victor J. Evans
Attorney

Witnesses
J. L. Wright
J. W. Garner

UNITED STATES PATENT OFFICE.

ZACHARIAH E. RICE, OF LANDISBURG, PENNSYLVANIA.

SPRING-CLIP FOR AUTOMOBILE-CHAIN FASTENERS.

1,220,002.

Specification of Letters Patent.

Patented Mar. 20, 1917.

Application filed April 7, 1916. Serial No. 89,643.

*To all whom it may concern:*

Be it known that I, ZACHARIAH E. RICE, a citizen of the United States, residing at Landisburg, in the county of Perry and State of Pennsylvania, have invented new and useful Improvements in Spring-Clips for Automobile-Chain Fasteners, of which the following is a specification.

This invention is an improved spring clip for use in connection with the hook member and guard casing of an automobile tire chain to prevent the guard casing from opening and thereby casually detaching the chain, the object of the invention being to provide an improved clip of this kind which may be readily attached to and used in connection with an automobile tire chain fastener.

The invention consists of a spring clip for arrangement on one side of an automobile chain fastener, and having a substantially semi-circular hook at one end to permanently engage the outer side of the hook member and having a comparatively shallow hook at the opposite end to detachably engage the outer edge of the guard casing, as hereinafter described and claimed.

In the accompanying drawings:—

For the purposes of this specification, the fastener of an automobile tire chain 1, is here shown, said fastener comprising the usual hook member 2 and the usual casing guard 3, one end of which is pivotally connected to the hook member by one of the chain links as at 4. A practical defect of the fastener is that the guard casing is liable to become casually moved to open position and hence to release the chain. My invention is a spring clip for use in connection with the hook member and guard casing of the fastener, to prevent the fastener from casually opening.

Figure 1:
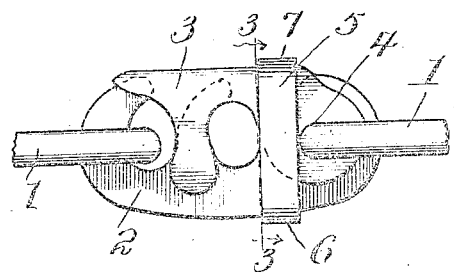
Figure 1 is a side elevation of the fastener of an automobile tire chain in closed position and provided with one of my improved clips.
Figure 2:
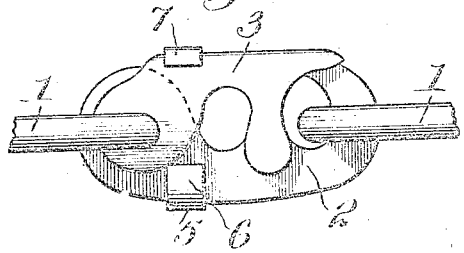
Fig. 2 is a similar view showing the opposite side of the fastener and clip.
Figure 3:
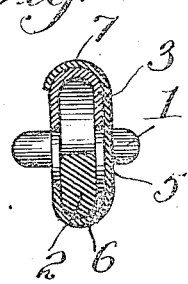
Fig. 3 is a transverse sectional view on the plane indicated by the line 3—3 of Fig. 1.
Figure 4:
Fig. 4 is a detail perspective view of the spring clip.

My improved spring clip 5 is of a length and breadth adapting it to be arranged transversely on one side of the fastener, near the pivotal end and is provided at one end with a relatively deep substantially semi-circular hook 6, to permanently engage around the outer side of the hook member and secure the clip thereto and is provided at the opposite end with a shallow, substantially C-shaped hook 7 to snap over the outer edge of the casing guard 3, when the latter is in closed position. The clip, by the provision of the deep hook 6 remains secured to the hook member, while its shallow C-shaped hook 7, may be snapped over or detached from the guard casing 3, as desired. One of the chain links 1 against the end of which the clip 5 bears, as shown in Fig. 1, prevents the clip from moving endwise of the hook member. Owing to its tension, the clip retains its position on the fastener and its hook 7 securely locks the guard casing so that the latter cannot be opened unless the hook 7 of the clip has been first, by the intent of the user, detached therefrom.

Having described the invention, what is claimed is:

In combination with the hook member and pivoted guard casing of an automobile tire chain fastener, a spring clip arranged transversely of and on one side of the fastener and provided with a deep substantially semi-circular hook at one end engaging around one side of the hook member and detachably but securely fastening the clip thereto, the clip being provided at the opposite end with a shallow substantially C-shaped hook adapted to snap over the outer edge of the guard casing and to be released therefrom, to permit the opening of the guard fastening, without removing the clip.

In testimony whereof I affix my signature in presence of two witnesses.

ZACHARIAH E. RICE.

Witnesses:
JOHN C. MOTTER,
C. A. ZONG.